Patented Jan. 4, 1949

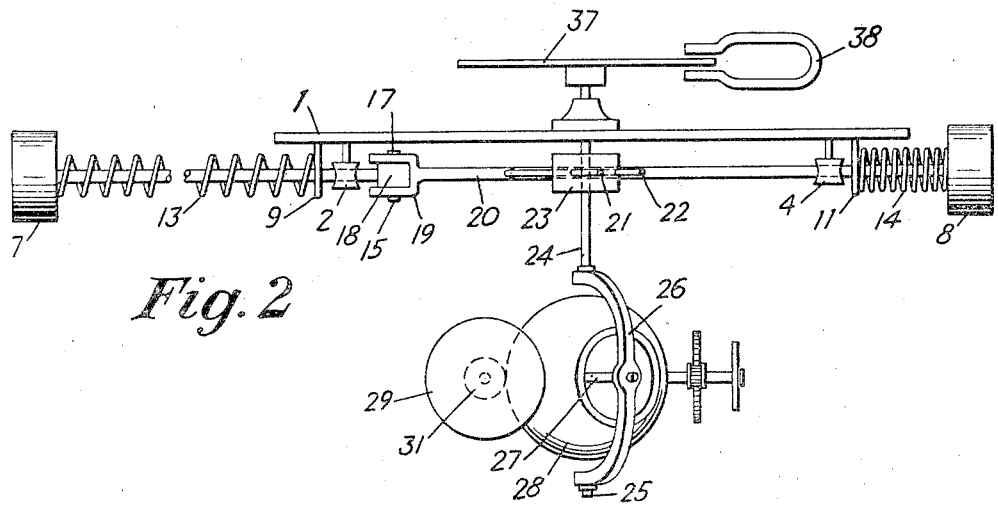
Fig. 2
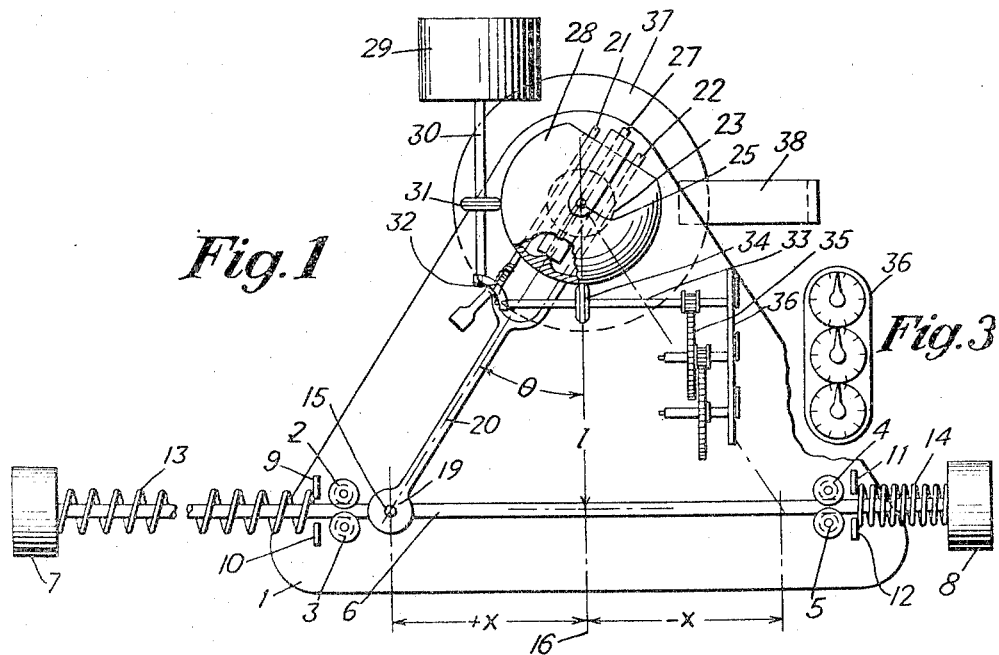
Fig. 1
Fig. 3
INVENTOR
Montford Morrison

2,458,016

UNITED STATES PATENT OFFICE 2,458,016

INTEGRATING ACCELEROMETER

Montford Morrison, Upper Montclair, N. J.

Application January 22, 1944, Serial No. 519,403

2 Claims. (Cl. 264—1)

The present invention relates to instruments for metering the changes of speed of moving bodies, it relates in particular to instruments for obtaining the mathematically integrated acceleration and deceleration, of moving vehicles, with respect to time, and relates specifically to speedometers for aircraft.

Among the objects of the invention are: to provide a simple and exact means for metering the acceleration and deceleration of moving vehicles; to provide for aircraft a speedometer which is small in size, light in weight and accurate in operation; and to provide such means and such speedometers in forms which are subject to inexpensive quantity production.

Further and other objects will be pointed out and apparent in the reading of the description hereunder particularly when taken in connection with the drawings, in which Fig. 1 represents an elevation of one embodiment of my invention, Fig. 2 is a plan view of Fig. 1, and Fig. 3 is a side view showing the indicators of the totalizing gear-chain employed in Fig. 1.

Referring to Figs. 1 and 2, 1 is a triangular plate of sheet material which serves as one of the supports for the mechanism of the embodiment. 2, 3, 4 and 5 comprise four rollers journaled upon shafts fixed to plate 1, and which rollers may revolve freely about the said shafts. The said rollers have a concave periphery, as illustrated in Fig. 2 at 2 and 4, and serve to hold the rod 6, Fig. 1, in alignment so that it may roll freely back and forth in an axial direction from east to west, in the figure, and vice versa. The extremities of rod 6 are provided with weights 7 and 8, fixed thereto. Plate 1 is further provided with fixed stops 9, 10, 11 and 12. Between stops 9 and 10 and weight 7, is located a compression spring 13, and likewise between stops 11 and 12 and weight 8, is located a compression spring 14. Springs 13 and 14 are so constructed and adjusted that when the instrument is at rest, that is, not under acceleration, the center line of the pin 15, assumes the neutral position represented by the vertical line 16. In other words, the springs are balanced to provide the null position of the instrument represented by the vertical line 16. The pin 15, Figs. 1 and 2, is fixed to the rod 6 and extends through said rod equally on both sides thereof, as illustrated by 15 and 17, Fig. 2. Rod 6 also carries a cylindrical member 18, Fig. 2, which serves as a lateral bearing for fork 19, Figs. 1 and 2. Fork 19 is free to turn about the axis of the pin 15, and has attached to it a very light tubular member 20. The reason for the lightness of the tubular member 20 will be hereinafter set forth.

Tubular member 20 is provided with a forked end, having two tines 21 and 22, Figs. 1 and 2. Tines 21 and 22 slide freely through a solid cylindrical member 23, which has a shaft 24 fixed in the center of the said cylindrical member 23, so that the shaft 24 revolves with the cylindrical member 23, when the member 23 turns. The tines 21 and 22, which slide freely in the solid cylindrical member 23, serve to turn the shaft 24 about its axis, when the rod 6 moves axially through its guide rollers 2, 3, 4 and 5. The shaft 24, Fig. 2, has a counterpart in the stub shaft 25, Figs. 1 and 2. Shafts 24 and 25 are provided with a connecting fork 26 which carries a fixed shaft 27, about which may revolve a spherical surface 28, Figs. 1 and 2.

Referring to Fig. 1, 29 is a motive source for constant-speed shaft 30. 29 may be any motor-means whatever, such as a clock movement or some other suitable source of constant speed. Constant-speed shaft 30 has fixed to it a friction roller 31, mounted in a bearing member 32, which holds the friction wheel 31 gently against the spherical surface 28. The shaft 30 is held in a generally vertical direction, in the figure, and exactly at right angles thereto is a second shaft 33 carrying a friction roller 34, which is held gently against spherical surface 28 also by bearing 32. Onto the east end of shaft 33 is provided a gear train 35, carrying a group of totalizing indicators 36, Figs. 1 and 3. The gear train 35 and the totalizers 36 are similar to those employed in integrating meters, such as electrical watt-hour meters, water-meters and other similar instruments. Onto the one end of shaft 24 is located metallic disc 37, Figs. 1 and 2, which is partially surrounded by an electro-magnet 38, providing an eddy current dampening device to prevent the shaft 24 from attaining a free oscillatory motion under operation, and providing critical dampening for the system. The metallic disc 37 and its cooperating electro-magnet 38 form a highly efficient damping system and is structurally similar to the related damping means commonly found in electrical watt-hour meters, in electrical deflection meters and in other similar instruments.

The effect of acceleration upon such a device, as shown and described, will now be set forth:

The assembly illustrated in Fig. 1 is caused to remain in a position such that the line l will always remain vertical and the rod 6 will, therefore, then always remain in a horizontal position with reference to the surface of the earth.

The simple relations between force, mass, acceleration and velocity are represented by the following equation:

$$\text{force} = \text{mass} \cdot \text{acceleration} = m\frac{dv}{dt} \quad (a)$$

Horizontal acceleration, which is produced by change in horizontal speed of a moving body, causes a force to be developed by the mass of the body in direct proportion to the acceleration attained by that said body.

In Fig. 1 the mass, which produces the acceleration measured by the present invention, is represented by weights 7 and 8 principally. Of course, the rod 6 does add some mass, depending upon its density and dimensions, and, further, the effective mass of the system to which the weights belong is also slightly affected by the mass of the tubular member 20, and this is the reason for providing tubular member 20 with as light a structure as practical.

After the instrument supports are fixed to the moving body whose acceleration is to be measured in a horizontal direction, when plate 1 is accelerated, the weights 7 and 8 tend to lag behind it because of the relations set forth in Equation a. The pin 15 rests in the vertical line 16 when the plate 1 is at rest, but the pin 15 will move to a position represented by $+x$ when the plate 1 accelerates in an easterly direction, in the figure, and to a position represented by $-x$ under deceleration in the same direction. The compressional qualities of springs 13 and 14 are such that they are compressed dimensionally in direct proportion to the force of acceleration developed in a horizontal direction.

The rod 6 then, and more specifically the pin center 15, becomes an indicating accelerometer, whose deflection under acceleration and under deceleration is measured by the distance $+x$ and $-x$ in the drawing. The distance $l$, that is, the distance between the center of shaft 25 and the path of the movement of rod 6 being constant, the relation between the acceleration and the angle represented by $\theta$ is given in the following relation:

$$\pm\frac{x}{l} = \pm\tan\theta \quad (b)$$

The above relation stated in language is that the acceleration indicated by such a system as described, is proportional to the tangent of the angle $\theta$, which may be expressed in the further relations given below:

$$\text{force} = \frac{x}{l} = m\frac{dv}{dt} = \tan\theta \quad (c)$$

From the above relations the following equation may be set up:

$$v = \int dv = \frac{1}{m}\int_{T_0}^{T_1} \tan\theta \, dt \quad (d)$$

which shows that the velocity, or speed, of any such system as described, with reference to ground, is instantaneously proportional to the integration of the tangent of the angle $\theta$ with respect to time, between the time represented by $T_0 = 0$, and the time at which the reading is taken when $T_1 = $ reading. This, of course, includes deceleration and the integration includes all the values of deceleration, as well as those of acceleration.

It now remains to describe how the tangent of the angle $\theta$ is integrated with respect to time, in the embodiment shown including my integrator. The structure of the integrator will be advantageously reviewed, accompanying a description of its operation.

To understand the principle of the embodiment of my integrator, reference may be had to Fig. 1. 30 is a constant-speed shaft which is made to rotate at a substantially uniform rate by any means whatever. In the illustration, I have provided shaft 30 with a constant-speed motor 29. These several parts are also shown in Fig. 2, which is a projected view taken at right angles to Fig. 1.

Of course, I do not limit myself to any specific device for producing a constant speed of shaft 30, as will be appreciated and more particularly pointed out in the appended claims.

With shaft 30 revolving at a constant speed, there is available a definite timing element, which may be utilized as the timing factor in the integration process of the instrument. 28 is a spherical segment which is free to revolve about axis 27, which is parallel to the plane of the paper. Axis 27 is free to revolve about a second axis 24, which is perpendicular to the plane of the paper in Fig. 1, and which structure may be clarified by reference to Fig. 2. The axis 24, when rotated, carries with it the axis 27, which in turn carries with it the spherical surface 28.

The shaft 30 carries with it wheel 31, which rotates the sphere about the axis 27 at a speed dependent upon the wheel surface 31 and the cosine of the angle $\theta$, which will be appreciated by inspection of the Fig. 1. Thus the speed of the sphere 28, about the axis 27, is proportional to the diameter of the wheel 31 divided by the cosine of the angle $\theta$. At right angles to the shaft 30 carrying wheel 31, is located shaft 33 carrying wheel 34. Wheels 31 and 34 are held gently against the surface of the sphere 28, as hereinbefore set forth. The pressure of wheels 31 and 34 upon spherical surface 28, is such that the spherical surface 28 may turn about the axis 24 producing a sliding action, between the said wheels and the spherical surface, as is well known in the art of planimeters, integraphs, harmonic analyzers and other similar integrating mathematical instruments. Shaft 33 is free to rotate when driven by spherical surface 28. The speed at which wheel 34 is driven is proportional to that of the circle about axis 27 on spherical surface 28, of a diameter proportional to the sine of the angle $\theta$, divided by the diameter of the wheel 34. The diameters of wheels 31 and 34 are substantially equal. Then in order to find the relative ratio of the gearing from wheel 31 to sphere 28, to wheel 34, take first the speed of the sphere, which is proportional to the diameter of 31 divided by the cosine of $\theta$, and multiply this value by the sine of $\theta$, divided by the diameter of the wheel 34. The two wheel diameters cancel out and give the relative speed represented by the sine of $\theta$ divided by the cosine of $\theta$, which is trigonometrically equal to the tangent of $\theta$. In other words, the ratio of this gearing is proportional to the tangent of the angle $\theta$, and the total number of revolutions of shaft 33, is proportional to the integration of the instantaneous values of the tangent of the angle $\theta$ multiplied by the timing elements furnished by wheel 31.

Thus the integrating device described functions to integrate the tangent of the angle $\theta$ with respect to time and the tangent of the angle θ is instantaneously equal to the acceleration or deceleration of the base plate 1 in a horizontal direction.

The instrument described thus becomes an integrating accelerometer which accurately indicates the actual horizontal speed of the instrument with reference to ground, by providing an instantaneous integration of all the accelerations and decelerations undergone by the instrument in a horizontal direction by the motion thereof in any direction whatever.

Having described one embodiment of my invention, the scope thereof is set forth in the claims hereunder.

What I claim is:

1. An integrating accelerometer comprising a constant-means-speed driving-shaft having a driving-wheel fixed thereto, a driven shaft having a driven-wheel fixed thereto, said shafts being rotatable in bearings all having fixed relations, a roller engaging both said wheels surfaced and rotatable in a bearing in movable relation to said shafts to form a variable ratio friction gear mechanically associating both said shafts, and means to change the ratio of said gear to correspond with the acceleration said accelerometer undergoes under operation.

2. An integrating accelerometer comprising a constant-mean-speed driving-shaft having a driving-wheel fixed thereto, a driven shaft having a driven-wheel fixed thereto, an integration indicator actuated by said driven shaft, said shafts being rotatable in bearings all having fixed relations, a roller engaging both said wheels surfaced and rotatable in a bearing in movable relation to said shafts to form a variable ratio friction gear mechanically associating both said shafts, and means to change the ratio of said gear to correspond with the acceleration said accelerometer undergoes under operation.

MONTFORD MORRISON.

REFERENCES CITED

The following references are of record in the file of this patent:

UNITED STATES PATENTS

| Number | Name | Date |
|---|---|---|
| 669,457 | Davison | Mar. 5, 1901 |
| 1,477,545 | Day | Dec. 18, 1923 |
| 1,677,220 | Aernout | July 17, 1928 |
| 2,231,957 | Shrader | Feb. 18, 1941 |

FOREIGN PATENTS

| Number | Country | Date |
|---|---|---|
| 124,318 | Great Britain | Mar. 27, 1919 |